Nov. 11, 1969  G. F. RUSSELL  3,477,206
GAS TREATMENT BY ADSORPTION
Filed Oct. 7, 1965
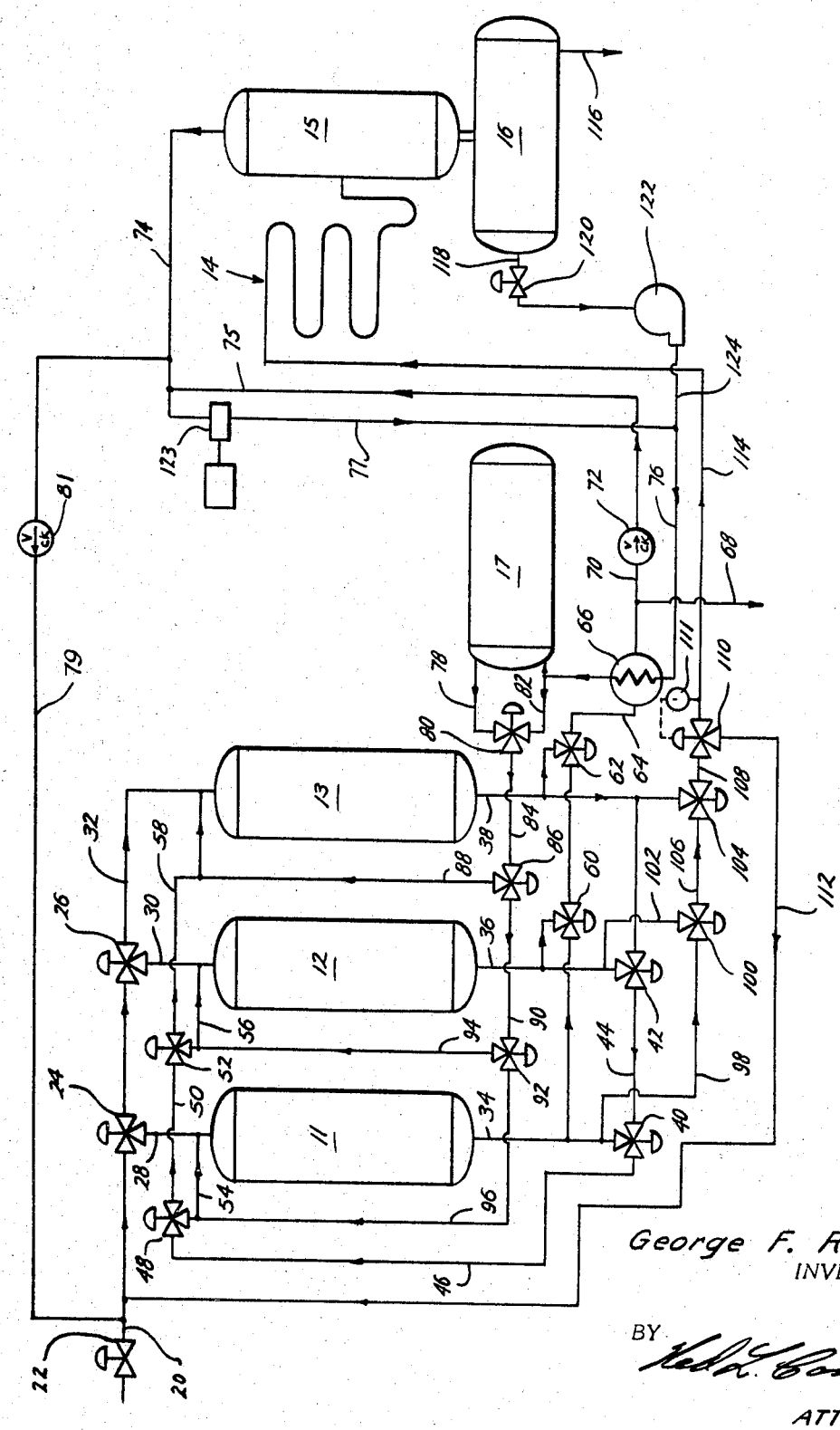
George F. Russell
INVENTOR.
BY
ATTORNEY

United States Patent Office 3,477,206
Patented Nov. 11, 1969

3,477,206
GAS TREATMENT BY ADSORPTION
George F. Russell, Houston, Tex., assignor to Russell Engineering Corporation, Houston, Tex., a corporation of Texas
Filed Oct. 7, 1965, Ser. No. 493,803
Int. Cl. B01d *53/04;* B01j *1/22*
U.S. Cl. 55—62     6 Claims

ABSTRACT OF THE DISCLOSURE

Apparatus and process for treatment of gaseous hydrocarbons to recover condensable materials therefrom comprising three beds of adsorbent materials which are alternately subjected to adsorbing, regeneration and cooling phases. The regeneration is accomplished by means of hot gas passing through the bed. When regeneration of a bed is substantially complete a portion of the hot gas from that bed is fed into the bed which is in the adsorption phase of the cycle. At the same time cool lean gas is directed into the bed which is on regeneration phase.

---

This invention relates to apparatus and a process for the treatment of gaseous, or primarily gaseous, hydrocarbons and for recovery of condensable materials therefrom. Such apparatus and methods as herein disclosed are also suitable for the processing of non-hydrocarbon materials, as will be apparent from the disclosure.

It is old and well known to recover condensables such as water and propane and heavier hydrocarbons from a hydrocarbon gas stream by alternately passing the gas stream through a plurality of beds of adsorbent materials which adsorb the condensables from the gas stream. Such a process and apparatus for practicing the process are shown and described, for example, in my U.S. Patent No. 3,061,992 issued Nov. 6, 1962. Similar processes are disclosed in U.S. Patents Nos. 3,121,002 to Kilgore et al., 2,739,664 to Parks, 2,790,505 to Dow, 2,765,868 to Parks, and 3,123,453 to Loomer et al. Many variations of the process are known, and these are by no means all of the patents which have been issued which describe such variations of the process. Usually the process is practiced by passing the gas stream containing condensable vapors through a first bed of adsorbent materials until the bed has become substantially saturated with the condensables. A hot gas is then flowed through this bed so as to heat it and vaporize the condensables adsorbed therein and drive the condensables out of the hot bed, thereby regenerating the bed. The hot gas containing the vaporized condensables is then passed through a condenser to an accumulator and the condensed liquids are drawn off. After the condensables have been driven out of the heated bed a cooling gas is passed through the heated bed, cooling the bed and thereby preparing it for again adsorbing more condensables from the gas stream. Thus, each of the beds alternately goes through an adsorption phase, a regeneration phase and a cooling phase.

It will be apparent that in the practice of such a process an important consideration will be the various temperatures required at various points in the process. For example, the gas coming into the process will usually be at about atmospheric temperature, usually less than 100° F. It is also usually desirable that the denuded gas delivered to the pipeline be at a temperature not in excess of about 130° F., thus preventing loss of heat and reducing thermal stresses in underground pipes. However, in order to regenerate the bed of adsorbent material it is necessary to heat the bed to a temperature of from 500° to 700° F. In order that efficient use of the equipment may be made, it is thus necessary to cool this bed down before it is utilized to adsorb condensable materials from the main gas stream.

It is an object of this invention to provide a more efficient recovery of liquids and more economic heat balance within a gas adsorption system.

A further object of the invention is to improve the efficiency of the adsorption process by a modification of the regeneration phase of the cycle.

These and other objects of the invention are accomplished, in a preferred embodiment of this invention, by beginning the regeneration phase in each bed prior to the completion of the adsorption phase in that bed. This is accomplished, according to a preferred embodiment of the invention, by taking the hot, rich outlet gas from the bed which is being regenerated by hot regeneration gas and adding this hot outlet gas to the main gas stream which is flowing to the bed which is on the adsorption phase. At the same time, the heating of the regeneration gas is stopped, and cool, dry and denuded gas is directed into the bed which is on regeneration phase. This is done only near the end of the period of adsorption and is continued for a short time so as to begin to build up a heated area at the inlet to the tower on adsorption phase, which heated area expands downwardly through the tower until just before it begins to desorb the condesable materials from this tower. Simultaneously, the bed on regeneration is being purged of the rich regeneration gas by the flow of cool, dry gas therethrough. Calculation of the period of time required for this purging is readily made. At this point, the combining of the hot gas stream with the main gas stream is terminated and another bed is put on adsorption, while the bed in which the heating phase has been started is put on regeneration phase.

For better understanding of the invention and the accomplishment of the objects thereof reference is now made to the following description and to the accompanying single drawing figure, which comprises a schematic flow diagram illustrating a preferred embodiment of the process and apparatus of the present invention.

In the processing of a natural gas stream the process of the present invention would be utilized for removing water, and propane and heavier hydrocarbons, and the following description will be made with reference to such an operation. However, such description is by way of example only, and the process and apparatus may also be used to separate condensable components from other gaseous mixtures.

Referring now to the drawing in detail there is shown a bank of three absorption towers 11, 12, and 13, a condenser 14, a knockout drum of regeneration gas scrubber 15, a liquid products accumulator 16, and a regeneration gas heater 17. As will hereafter be seen, these principal apparatus elements are interconnected by suitable piping and controls for their operation.

The entering or main gas stream is introduced to the system through a pipe 20, flow therethrough being controlled by a valve 22, and flow direction being indicated by an arrow. Pipe 20 leads to a first three-way valve 24 and to a second three-way valve 26. Pipe 28 is connected between the first three-way valve 24 and the absorption tower 11. Pipe 30 is connected between the second three-way valve 26 and the adsorber 12. A pipe 32 is connected between three-way valve 26 and adsorber 13. Thus the main gas stream may be fed into any of adsorbers 11, 12 and 13 as may be determined by the position of the valves 24 and 26.

At the lower or outlet ends of the adsorbers 11, 12 and 13 outlet pipes 34, 36 and 38 respectively are provided. Outlet pipe 34 leads to a three-way valve 40, and pipes 36 and 38 lead to a three-way valve 42. A pipe 44 is connected between the valves 40 and 42, and a pipe 46 is connected from valve 40 to a three-way valve 48 at the top of tower 11, which valve in turn is connected to a pipe 50 leading to a three-way valve 52. Gas may be flowed from pipe 46 into adsorption tower 11 by proper positioning of valve 48 so as to allow flow through pipe 54 at the upper end of adsorption tower 11. Similarly gas from pipe 46 may be conducted to adsorption tower 12 by rotating valves 48 and 52 to allow flow through the pipe 56 into the upper end of adsorption tower 12; and gas may be conducted from pipe 46 into the top of tower 13 by changing the positions of valves 48 and 52 to allow flow through the pipes 50 and 58.

Looking again at the outlet pipes 34, 36 and 38 from the adsorption towers, it will be seen that pipe 34 is connected to a three-way valve 60, and that pipe 36 is connected to this same valve while pipe 38 is connected to a three-way valve 62. Thus according to the adjustment of valves 60 and 62 fluid may flow as desired from any one of the adsorption towers into a pipe 64 which leads to a heat exchanger 66. From this heat exchanger the gas may flow to a gas product outlet pipe 68. Alternatively, some of the gas product may flow through pipe 70, which is provided with a check valve 72. Under proper positioning of valve 110, to be hereinafter described, a portion of the stripped gas which flows through line 64 and heat exchanger 66 is withdrawn by compressor 123 through line 70, the check valve 72, line 75 and thence into lines 74 and 77.

A bypass line 79 provided with a check valve 81 is connected between line 74 and the main gas inlet line 20, so as to relieve any excess pressures which may be built up in line 74.

Pipe 77 connects into a pipe 76 which leads through the heat exchanger 66 and thence into the heater 17 which may, for example, be a salt bath type heater capable of heating fluid flowing in heat exchanger relationship therewith to temperatures of 700° F. or higher. Pipe 78 leading from the heater 17 connects into a three-way valve 80, which is also connected to a bypass line 82 and to a pipe 84 leading to another three-way valve 86. The valve 86 is connected to a pipe 88 which intersects pipe 54 so that it may conduct fluid into the upper end of adsorption tower 13. Valve 86 is also connected to a pipe 90 which leads to a three-way valve 92. Valve 92 is connected to a pipe 94 which intersects pipe 56 leading to the upper end of adsorption tower 12. Valve 92 is also connected to a pipe 96 which intersects pipe 54 at the upper end of adsorption tower 11, so that it may conduct fluid from pipe 96 into the upper end of the tower 11.

Looking again at the lower end of the towers 11, 12 and 13 it will be seen that outlet pipe 34 has connected thereto a pipe 98 which leads to a three-way valve 100; pipe 36 has connected thereto a pipe 102 which also leads to the three-way valve 100; and outlet pipe 38 leads to a three-way valve 104. A pipe 106 connects valves 100 and 104. Another pipe 108 connected to valve 104 leads to another three-way valve 110. A line 112 leads from valve 110 back to intersect the main gas stream inlet pipe 20. Another pipe 114 connected to valve 110 leads to the condenser 14 which is in turn connected with the knockout drum 15. Positioned below the knockout drum 15 is an accumulator for receiving liquid materials separated from the gas. Accumulator 16 has a liquid product outlet line 116 and also has a liquid flow line 118 leading through a valve 120 into a pump 122. Pump 122 is arranged to pump liquid through a line 124 into gas line 76, previously described.

It should be understood that the complete operating system normally contains numerous controls which cause operation of the various valves in the system in accordance with desired process characteristics so that some of the valves are operated in response to temperature changes, other valves are operated in response to pressure changes, and still other valves are operated according to a time cycle. Nevertheless, such control apparatus has not been shown herein for the reason that many variations of the controls are well known in the art and may be applied in accordance with the desires of those constructing the apparatus. Therefore, since such control apparatus does not form a part of this invention, it has been omitted in order to simplify the drawing and description and make it more readily understandable by those skilled in the art. It should be understood that such control apparatus as is well known in the art to be required to cause the apparatus to function as hereinafter described will usually be included in the system.

In the operation of the apparatus and process of this invention one of the towers 11, 12 or 13 is usually on the adsorpton phase of the process while a second tower is on the regeneration phase and the third on a cooling phase. As soon as the three towers have completed the phases on which they are operating the valves are switched so that each tower begins a new phase. For the purpose of explaining the operation herein it will be assumed that tower 11 is on the adsorption phase, tower 12 is on the regeneration phase, and tower 13 is on the cooling phase.

At such stage of the operation the main gas stream flows through line 20, valve 24 and pipe 28 into the adsorption tower 11. In the adsorption tower 11, which is filled wtih adsorbent material, the waetr and heavier hydrocarbon fractions, usually propane and heavier, are adsorbed on the adsorbent material and comparatively denuded, dry, cool gas passes out of the bottom of the tower through pipe 34. Gas which has been substantially stripped of condensables is referred to herein as "stripped" or "denuded." In a preferred form of the invention this stripped cool gas is passed through valve 40, which is positioned so that the gas flows then to line 46, valve 48, line 50, valve 52 and line 58 into the upper end of adsorption tower 13, so as to provide a cooling gas to cool the adsorbent bed in this tower, which has previously been regenerated by hot gas, as hereinafter described. Upon passing through the tower 13 the gas is heated up to substantially the temperature of the hot bed which it is cooling, and then exits through outlet pipe 38. Valves 104 and 42 are closed to flow from line 38 whereas valve 62 is positioned to allow flow therethrough into line 64 and through the counterflow heat exchanger 66. In thet heat exchanger 66 the gas is cooled to a temperature suitable for flow into the products line, usually not over about 130° F., and thus may be passed outwardly through the products line 68.

At the same time that this process is taking place the adsorbent bed in adsorption tower 12 is being regenerated by means of hot gases. Regenerative gas is pumped through pipe 76 by compressor 123 and passes through the heat exchanger 66 being preheated therein by gas flowing through pipe 64, before passing to the heater 17 which may, for example, be a hot salt bath heat exchanger having a temperature of up to 800° F. The gas is heated herein to a temperature of 550° F. to 700° F., whereupon it passes out through line 78, three-way valve 80, line 84, line 90 and lines 94 and 56 into the upper end of the adsorption tower 12. Valves 80, 86, 92, 26 and 52 are, of course, positioned so as to cause flow as thus described.

As is well known in the art, the hot gases flowing into the tower 12, within which condensables have been adsorbed during a previous stage of the process, cause these condensables to be evaporated, or desorbed, off of the adsorbent bed material within the tower, and to be carried downwardly and out of the tower through outlet pipe 36 in the bottom of the tower. Valves 42 and 60 are at this point positioned to prevent flow from pipe 36 therethrough, whereas valve 100 allows flow from pipe 36 and connecting pipe 102 to pass through pipe 106, valve 104, pipe 108, valve 110 and pipe 114. The pipe 114 carries the hot gas containing evaporated water and hydrocarbons through cooling equipment indicated herein by a condenser 14 and to a knockout tower 15 or other means for separating the condensables from the gas so as to produce a denuded gasw hich may flow upwardly therefrom through line 74, and to produce liquid products which flow downwardly therefrom into the accumulator 16.

Liquid products are drawn from the accumulator 16 through line 116. At the same time, in one embodiment of the invention, a portion of the liquid material, which may include water and/or hydrocarbons, may be drawn off through line 118 and valve 120 by pump 122, which causes flow of these liquid materials into the line 76 to admix with the liquid free gas flowing from the top of the knockout tower 15 to line 74. The process for using liquid materials for regeneration of beds is described in my previous Patetnt No. 3,061,992. The admixed gas and liquid passes through line 76 into the heat exchange 66, whereupon as previously described, it is preheated by the gas flowing countercurrently through line 64.

According to the present invention, the hot, wet regeneration gas drawn off the tower 12 is not returned to the condenser 14 throughout the entire period of regeneration. Instead, prior to the completion of the regeneration phase of the bed in tower 12, valve 110 is operated to route the flow of the hot, wet regeneration gas through line 112 so as to cause it to admix with the main gas stream flowing into the system through line 20. Thus, since at this point tower 11 is on the adsorption phase of the cycle, the hot wet gases are admixed with the main gas stream which is passing into tower 11 and in which adsorption is taking place.

At the same time, valve 80 is operated so as to cause the regeneration gas to bypass the heater 17, and flow of liquid water and/or hydrocarbons from pipe 124 to pipe 76 is stopped, so that substantially cool, denuded gas flows into the top of tower 12. By this time, gas flowing from tower 13 through the heat exchange 66 is fairly cool, so that there is little heating of the regeneration gas therein. The flow of this relatively cool, denuded gas into the upper end of tower 12 purges the hot, rich vapors out of the bed therein and carries them on to tower 11, thereby leaving this bed substantially free of condensables.

The switching of valve 110 to cause the regeneration gas to be admixed with the main gas stream takes place when most of the liquid products have been evaporated out of the bed of tower 12. Normally the switching point is when about 95 percent of the adsorbed material has been stripped from the bed, although other percentages, from 85 percent to 98 percent, might be selected in some instances depending upon the ratio of total gas flowing to pounds mass adsorbent per bed, determined by checking the outlet temperature and/or composition of the gas flowing out of the tower 12. Usually this temperature is in the range of 400° to 500° F. when about 95 percent regeneration has been accomplished, so valves 80 and 110 may be operated by a temperature control 111 in line 114.

Percentage regeneration as used herein indicates the percentage of condensables which are desorbed as compared to the amount which is desorbed in the full regeneration stage. It is not expected that the full regeneration stage will desorb all the condensables from the tower. Thus the percentages used are only representative. The important point is to recover the major proportion of the desorbable material before the valves 80 and 110 are switched.

In a preferred embodiment of the invention, the high temperature heating of the regeneration gas is terminated at the same time as preheating of tower 11 begins, by switching valve 80 so as to allow gas flowing from the heat exchanger 66 to bypass the salt bath 17 and flow through line 82 to the tower 12 on regeneration. It will be apparent that the temperature of the gas flowing out of tower 12 will still continue to rise for some period because of the hot gas in the upper part of the tower which is still moving downwardly therethrough. However the cool gas flowing thereinto will carry out condensable vapors, thus continuing the regeneration of the bed.

The gas admixed with the main gas stream flowing into tower 11 may be at a temperature of 400° to 700° F. The admixture will be in varying proportions, but nevertheless it will be apparent that the temperature of the gas flowing into the top of the adsorption tower 11 near the end of its adsorption phase may have a temperature of 200° F. to 400° F. or more. This starts to heat the upper end of tower 11 so as to actually cause some desorption of the bed, particularly of lighter fractions which have been adsorbed therein, before the adsorption phase has ended in that tower, because of displacement by heavier hydrocarbons introduced from tower 12. Often the beds in such towers are arranged so that a water selective adsorbent is positioned at the top of the bed and the hot gas flowing in will therefore tend to selectively drive lighter hydrocarbons out of the upper end of the tower so that they can be adsorbed upon the lower portion of the bed, which has greater affinity for heavier molecular weight hydrocarbons. It will be apparent that since the hot gas comes in at the top it will be cooled as it passes downwardly through the adsorbent bed in the tower and therefore will not, at least initially, cause any desorption of the lower part of the bed.

However, the flow of hot gas into the bed causes a heat front to move slowly down the bed. The speed of the heat front varies, depending on gas throughout and bed size, and the time required for hot rich gas to reach the outlet of the tower is therefore readily determined.

If this passing of hot gas into the tower on adsorption phase is continued overly long the outlet gas will begin to heat up, thereby indicating that some of the condensable are being desorbed and lost, or at least are not being fully adsorbed in the tower. This condition is undesirable, of course, and before losses occur the process is moved forward one stage in the cycle. A timer may be used to control valve operation at this point, causing operation of valves 80 and 110 to their previous positions. The gas flow rates and timing are preferably such that by this time purging of tower 12 will have been completed.

At the same time valves are automatically operated as necessary to start the flow of hot regeneration gas from the salt bath 17 through the tower 11 so as to continue heating the bed therein and drive adsorbed condensables therefrom. Tower 12 then becomes the tower which is being cooled and tower 13 becomes the tower which is on the adsorbent phase of the cycle. Other valves are switched as necessary to start the cycle all over again with the main gas stream flowing into tower 13, dry and denuded gas from tower 13 being used to cool tower 12, and the gas coming from tower 12 passing through the heat exchanger 66 to preheat the regeneration gas. The hot rich regeneration gas flowing from tower 11 is passed through the cooling equipment to separate liquids therefrom.

During the latter part of each cycle of the process, when gas coming from the tower on regeneration is being fed into the tower on adsorption, it is of course necessary to replenish the gas in the regeneration circuit of the system. This is accomplished by supplying cool dry gas from the line 64 exiting from the now cool heat exchanger 66. In other words, part of the product gas is automatically passed through line 70 and check valve 72 into line 74 when valve 110 closes while compressor 123 is running. It will be apparent that this will be accomplished in the event that the gas in the regeneration circuit is depleted to the point that the pressure drops below the pressure in line 70.

It will be seen that putting the purged regeneration gas into the tower on adsorption prior to the completion of the adsorption phase in that tower causes this tower to actually begin its regeneration phase before it completes its adsorption phase, thus the heat in the outlet gas from the tower on regeneration is being utilized to begin regeneration of another tower rather than being lost, as is necessitated if it passes directly to the condenser 14. This, of course, reduces the total amount of heat necessary to be applied to the tower which is next on regeneration phase, and also saves and recovers the lost condensables stripped from the tower which was on regeneration, which would otherwise pass into the gas products line.

It will be appreciated that the process as herein described may have many variations as to time and temperature and other variations which may depend upon the specific composition of the gas being treated and upon the nature of the condensables which are being separated therefrom. It will also be appreciated that the time for switching from one condition to another condition of the system may be determined by calculation or by temperature at various points within the system, and that the switching operations may be automatic so that the enire system operates without the necessity for any operator to control it. Various flow regulators may also be installed as required to regulate the rate of flow or the direction of flow of the various gas streams through the system. The locations and setting for such regulators will be apparent to those skilled in the art and will vary, of course, depending upon other conditions present in the system, and therefore, can not be described in detail in this application in such a manner as to have general application to apparatus of this type.

It has not been intended to describe herein all the various pieces of equipment which may be utilized in such a system, but to merely describe those elements which are essential for a clear understanding of the operation of the present invention without overly burdening the description with recitation of numerous other elements commonly used in such systems all of which are well known in the art and which do not form any part of the present invention.

Accordingly, the foregoing has been a description of a preferred embodiment of the invention, but the invention is not limited to the preferred embodiment, but only as set forth by the following claims.

I claim:
1. A process for recovering condensables from a main gas stream which comprises
   passing the main gas stream through a bed containing adsorbent material, whereby condensables are adsorbing in the bed, for a period sufficient to substantially saturate the adsorbent material,
   just prior to the end of each such period, when the adsorption is substantially complete, combining with said main stream a hot regeneration gas stream, to raise the temperature of the combined stream to about 200° F. or higher,
   terminating the flow of the combined streams through the bed substantially before removal of adsorbed condensables begins, and
   following each such period, passing a hot regeneration gas through the bed.
2. A process for recovering condensables from a main gas stream which comprises
   alternately passing the main gas stream through at least three separate beds containing adsorbent material, whereby condensables are adsorbed in each bed while the main gas stream is passing therethrough, for a period sufficient to substantially saturate the adsorbent material,
   just prior to the end of each such period, when the adsorption is substantially complete, combining with said main gas stream a hot regeneration gas stream, to raise the temperature of the combined stream to about 200° F. or higher,
   terminating the flow of the combined streams at the end of the period, substantially before removal of adsorbed condensables begins,
   following each such period, passing a hot regeneration gas through the bed containing adsorbed condensables, for a time sufficient to substantially regenerate the bed,
   passing a cooling gas through the regenerated bed, and repeating the same steps.
3. In a process for recovering condensables from a gas stream which is alternately passed through at least three separate beds containing adsorbent material to remove the condensables from the gas stream and which beds are simultaneously and continuously but alternately going through adsorption, regeneration, and cooling phases, the improvement comprising
   continuing each adsorption phase for a period sufficient to substantially saturate the adsorbent material,
   just prior to the end of each such period, when the adsorption is substantially complete, combining with the main gas stream from which condensables are to be adsorbed the hot gas stream which has just passed through the bed on regeneration phase, to raise the temperature of the combined stream to about 200° F. or higher, and
   terminating each flow of such combined stereams at the end of such period, substantially before removal of adsorbed condensables begins.
4. A process as defined by claim 3, and including
   purging the bed on regeneration phase with relatively cool gas during the period of combining the hot gas stream with the main gas stream.
5. In a process for recovering condensables from a gas stream which is alternately passed through at least three separate beds containing adsorbent material to remove the condensables from the gas stream and which beds are simultaneously and continuously but alternately going through adsorption, regeneration, and cooling phases, the improvement comprising
   continuing each adsorption phase for a period sufficient to substantially saturate the adsorbent material,
   prior to the end of each such period, when regeneration is at least about 85% complete, combining with the main gas stream from which condensables are to be adsorbed, the hot gas stream which has just passed through the bed on regeneration phase, the hot gas stream being at substantially the temperature of the outlet from the bed being regenerated, and
   terminating each flow of such combined streams at the end of such period, substantially before the bed on adsorption phase is heated enough to cause substantial removal of adsorbed condensables therefrom.
6. A process as defined by claim 5 and including
   purging the bed on regeneration phase with relatively cool gas during the period of combining the hot gas stream with the main gas stream.

References Cited

UNITED STATES PATENTS

| 3,192,687 | 7/1965 | Silva et al. | 55—62 X |
| 3,298,390 | 12/1966 | Humphries | 55—62 |
| 3,378,992 | 4/1968 | Pierce et al. | 55—62 |

REUBEN FRIEDMAN, Primary Examiner

JOHN ADEE, Assistant Examiner